United States Patent
Suzuki

(10) Patent No.: US 8,958,097 B2
(45) Date of Patent: Feb. 17, 2015

(54) INFORMATION PROCESSING APPARATUS

(71) Applicants: Kabushiki Kaisha Toshiba, Minato-ku, Tokyo (JP); Toshiba Tec Kabushiki Kaisha, Shinagawa-ku, Tokyo (JP)

(72) Inventor: Ryo Suzuki, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 29 days.

(21) Appl. No.: 13/742,814

(22) Filed: Jan. 16, 2013

(65) Prior Publication Data

US 2013/0182287 A1    Jul. 18, 2013

Related U.S. Application Data

(60) Provisional application No. 61/587,215, filed on Jan. 17, 2012.

(51) Int. Cl.
*G06F 3/12* (2006.01)
*H04N 1/00* (2006.01)

(52) U.S. Cl.
CPC ......... *H04N 1/00347* (2013.01); *H04N 1/0097* (2013.01); *H04N 1/00973* (2013.01); *H04N 2201/0094* (2013.01)
USPC .......................... 358/1.15; 358/1.13; 358/1.16

(58) Field of Classification Search
CPC ............ H04N 1/00347; H04N 1/0097; H04N 1/00973; H04N 2201/0094
USPC .................................. 358/1.1–1.9, 1.11–1.18
See application file for complete search history.

(56) References Cited

U.S. PATENT DOCUMENTS

| | | | |
|---|---|---|---|
| 5,794,246 A * | 8/1998 | Sankaran et al. | 1/1 |
| 6,981,001 B1 * | 12/2005 | Reddick et al. | 1/1 |
| 2003/0046195 A1 * | 3/2003 | Mao | 705/30 |
| 2003/0090694 A1 * | 5/2003 | Kennedy et al. | 358/1.13 |
| 2006/0146604 A1 * | 7/2006 | Muraki et al. | 365/185.04 |
| 2008/0212137 A1 | 9/2008 | Iwata et al. | |
| 2008/0260416 A1 * | 10/2008 | Nosaki | 399/88 |

* cited by examiner

*Primary Examiner* — King Poon
*Assistant Examiner* — Ibrahim Siddo
(74) *Attorney, Agent, or Firm* — Amin, Turocy & Watson, LLP

(57) ABSTRACT

An information processing apparatus comprises: a storage unit writes a file of one's own apparatus including an array of the records and a definition information of one's own apparatus defining the data form of the record of the file; an input unit inputs a file based on the data form of other apparatuses; a determination unit determine whether or not the item name between the file of other apparatuses input by the input unit and the file of one's own apparatus stored in the storage unit are met by comparing every record; and an alignment processing unit transfers the item name and the input field in file of other apparatuses which is determined that the item names are not met by the determination unit to the storage unit and updates the file of one's own apparatus, and aligns the item names and the input field between apparatuses.

10 Claims, 8 Drawing Sheets

| A | B | C | D | E |
|---|---|---|---|---|
| FAX NUMBER | DEPARTMENT CODE | | | ONE-TOUCH |
| | | | | |

22

(b)

| A | B | C | D | E |
|---|---|---|---|---|
| FAX NUMBER | DEPARTMENT CODE | | | ONE-TOUCH |
| 1-800-222 | 666 | | | |
| 1-800-333 | 777 | | | |
| ... | ... | | | |
| 1-800-444 | 888 | | | |

22

(c)

| A | B | C | D | E |
|---|---|---|---|---|
| FAX NUMBER | DEPARTMENT CODE | | ONE-TOUCH | ABBREVIATED DIALING |
| 1-800-222 | 666 | | 1 | 01 |
| 1-800-333 | 777 | | 2 | 02 |
| ... | ... | | ... | ... |
| 1-800-444 | 888 | | 9 | 20 |

| A | B | C | D | E |
|---|---|---|---|---|
| EXTENSION NUMBER | EMAIL | IN TIMES OF TROUBLE | ... | ... |
| 7689 ... 7691 | a@AAA ... b@BBB | 03- ... 03- | ... | ... |

(b)

| A | B | C | D | E |
|---|---|---|---|---|
| NORMAL CONSUMPTION MODE | LOW CONSUMPTION MODE | ... | ... | ... |
| FIXING TEMPERATURE 1 STANDBY TEMPERATURE 1 ... | FIXING TEMPERATURE 2 STANDBY TEMPERATURE 2 | | | |

(c)

| A | B | C | D | E |
|---|---|---|---|---|
| 1 FLOOR | ABOVE 2 FLOORS | ... | ... | ... |
| COLOR PRINTING ... | MONOCHROME PRINTING | | | |

(d)

| A | B | C | D | E |
|---|---|---|---|---|
| NORMAL AREA | RESTRICTED AREA | ... | ... | ... |
| 1in1 ... | 2in1 ... | | | |

(a)

(b)

INFORMATION PROCESSING APPARATUS

CROSS-REFERENCE TO RELATED APPLICATIONS

This application is based upon and claims the benefit of priority from U.S. Provisional Application No. 61/587,215 filed on Jan. 17, 2012; the entire contents of which are incorporated herein by reference.

FIELD

Embodiments described herein relate to an information processing apparatus.

BACKGROUND

Conventionally, an information processing apparatus such as a multi-function printer is known which stores an address book data file and input/output the address book data to and from other machines.

An information processing apparatus such as the multi-function printer (MFP) stores a telephone directory and department codes as registration data. The registration data refers to the data that is set centrally for management. In a company having a plurality of information processing apparatuses, the same registration data containing a telephone directory and department codes assigned to different business offices is set in each of the information processing apparatuses.

In a setting process, the original information processing apparatus exports the registration data as a data file in CSV (comma separated values) or XML (extensible markup language) format. A client personal computer accesses the original information processing apparatus and distributes the exported CSV file to a plurality of other information processing apparatuses. In a plurality of information processing apparatuses of the same kind, an imported CSV file is used to set the same registration data containing a telephone directory and department codes. The telephone directory data is referred to on an operation panel.

BRIEF DESCRIPTION OF THE DRAWINGS

FIG. 6(a)-FIG. 6(c) is a tabular drawing showing an example of an alignment process carried out by the information processing apparatus involved in embodiment 1.

FIG. 7 is a tabular drawing showing another example of the records in a file set in an information processing apparatus involved in embodiment 2.

DETAILED DESCRIPTION

In accordance with an embodiment, an information processing apparatus comprises: a storage unit configured to store a file of one's own apparatus including an array of the records containing an item name and an input field which are different between one's own apparatus and another kind of apparatus and a definition information of one's own apparatus defining the data form of the record of one's own apparatus; an input unit configured to input a file of another kind of apparatus based on the data forms of one's own apparatus and the another kind of apparatus; a reading unit configured to read the plurality of record contained in each file input by the input unit, the item name contained in the record and the input fields for each item name; a determination unit configured to determine whether or not the item name between the file of another kind of apparatus input by the input unit and the file of one's own apparatus stored in the storage unit are met by comparing the records of each file read by reading unit; and an alignment processing unit configured to transfer the item name and the input field in file of another kind of apparatus which is determined that the item names are not met by the determination unit to the file of one's own apparatus, and align the item names and input fields for different kinds of apparatuses.

(EMBODIMENT 1)

Figure 1:
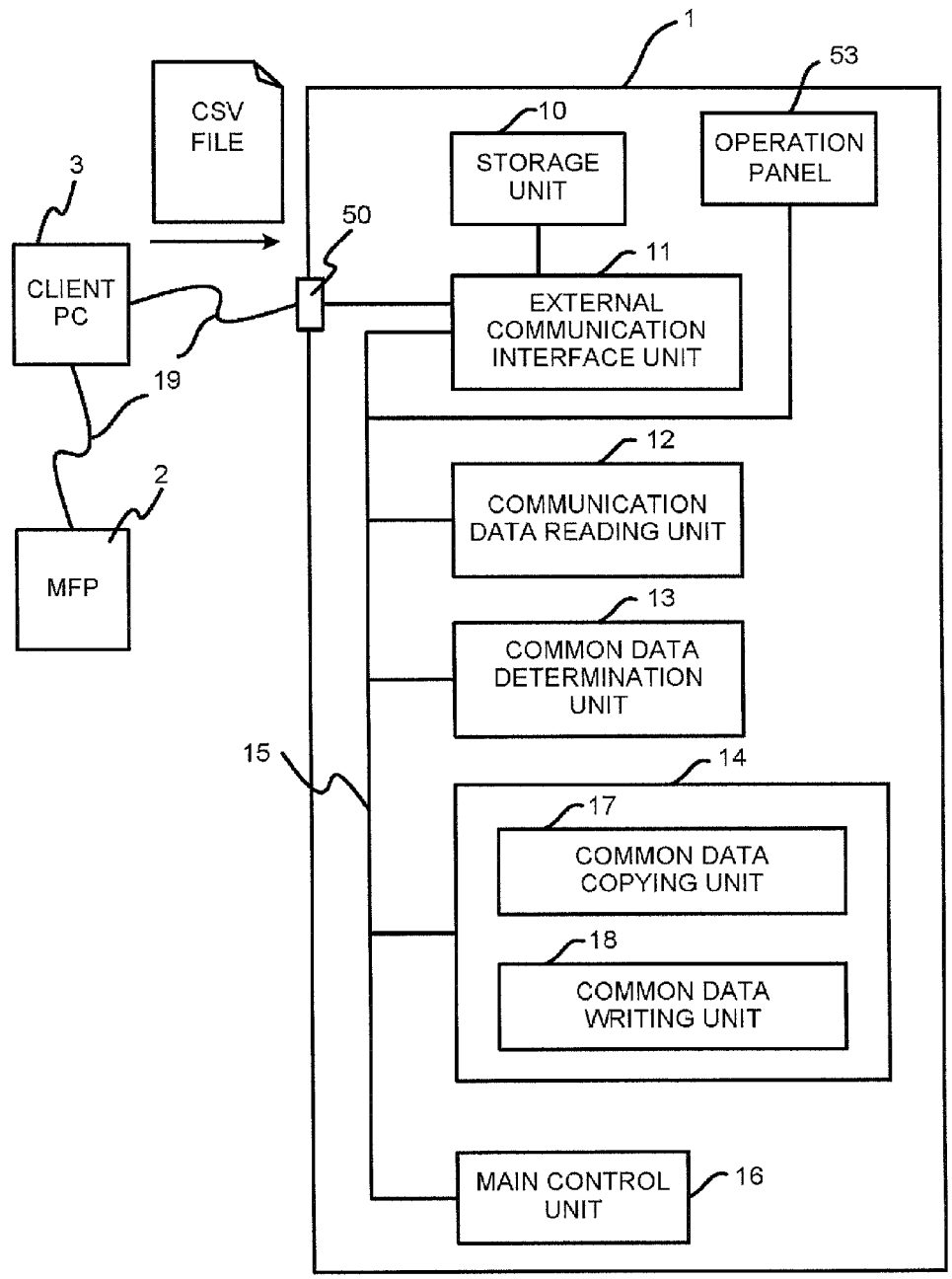
FIG. 1 is a control block diagram of an imformation processing apparatus involved in embodiment 1.

FIG. 1 is a control block diagram of an information processing apparatus such as a multi-function printer (MFP) involved in embodiment 1. MFP 1 (information processing apparatus) is one's own apparatus which is included in a plurality of different kinds of MFPs installed in a business office, and MFP2 are another kind of apparatus. The MFP1 and the MFP2 are accessible to a client PC (personal computer).

The MFP1 comprises: CSV file (a file of one's own apparatus) that is a record including an item name and a plurality of input fields and includes an array of the records which are different between one's own apparatus and another kind of apparatus (MFP2); a storage unit 10 configured to store a definition information of one's own apparatus defining the data form of the record of one's own apparatus; an external communication interface unit 11 (an input unit) configured to input a file of another kind of apparatus, that is, MFP2 based on the data forms of one's own apparatus and the another kind of apparatus. In addition, the MFP1 is provided with an operation panel 53 which serves as an input unit to accept an inputting operation of the files of one's own apparatus.

The data form of a record refers to the format of the records contained in the file. The definition information of the data form of a record refers to the information defining the type of the item names of a plurality of records, the arrangement order of the item names and the size and display form of a plurality of input fields aiming at the item names.

FIG. 2(a) is a tabular drawing showing an example of the data form of the records contained in a CSV file (file of one's own apparatus) set in one's own apparatus. FIG. 2(a) shows an example of a screen showing the records displayed on a client PC3 or an operation panel by an application. For the sake of convenience, a CSV file 20 read into the MFP 1 has a plurality of records distinguished by columns A, B, C, D and E. The record included in the column A consists of an item name such as 'FAX Number' and a plurality of input fields which follow the item name 'FAX Number' and into which registration data such as '03-...', '055-...' is written. The record included in the column B consists of an item name 'department code' and a plurality of input fields aiming at the item name 'department code'. Numeric, strings and other symbols are input into the input fields of the item names 'FAX number' and 'department code' as registration data of a kind of apparatus. The item names and the input files are arranged in the vertical direction (longitudinally) on the display screen to form one record. The records are arranged from left to right (horizontally) to form a file.

The MFP1 shown in FIG. 1 comprises: a communication data reading unit 12(the reading unit)configured to read the records contained in each file input from the client PC3 to the external communication interface unit 11 and the file input by operating through the operation panel 53, the item names contained in the records and the input fields aiming at the item names and to decode communication data; and a common data determination unit 13 (determination unit) configured to determine whether or not the common item names of a CSV file of another kind of apparatus input to the external communication interface unit 11 and a CSV file of one's own apparatus stored in the storage unit 10 are consistent by comparing the records in the files of one's own apparatus and another kind of apparatus read by the communication data reading unit 12. Additionally, the MFP1 further comprises: an alignment processing unit 14 configured to transfer the item name and the input field in file of another kind of apparatus which is determined that the common item names are met by the common data determination unit to the file of one's own apparatus, and align the item names and input fields for different kinds of apparatuses; a data bus line 15 configured to connect each unit with a bus line; and a main controller 16.

The MFP2 serving as another kind of apparatus substantially has the same function with the MFP1. FIG. 2(b) is a tabular drawing showing an example of the data form of a record contained in a CSV file (file of another kind of apparatus) set in the MFP2. The example of the CSV file 21 differs from the CSV 20 in the data form of the record and the order of records, the CSV file 21 has the data form differ from the data form of the record of the CSV file 20.

In FIG. 1, the MFP1 and the MFP2 are both connected with an LAN (local area network) 19. The client PC3 is capable of executing an application for transmitting a file between the MFP1 and the MFP2 and reading a file. The client PC3 can access the MFP1 and the MFP2 via the LAN 19. The client PC3 can read the CSV file 21 from the MFP2 and send the CSV file 21 to the MFP1.

Figure 3:
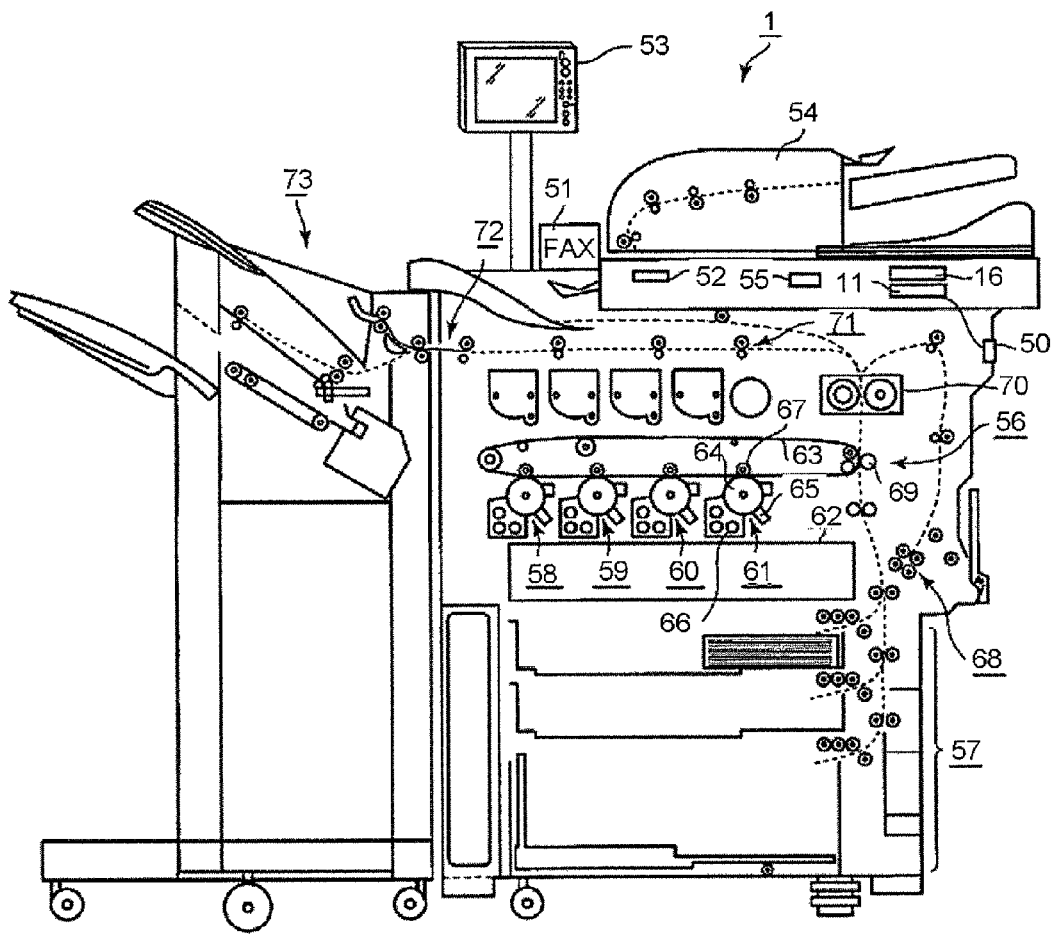
FIG. 3 is a diagram showing the whole structure of the information processing apparatus involved in embodiment 1.

FIG. 3 is a diagram showing the whole structure of the MFP1. The reference symbol described above denotes the same member. The MFP1 arranged on the lateral side of the main body comprises: a connector 50 connected with the external communication interface unit 11; a FAX apparatus 51 making a call by means of a telephone directory and a abbreviated dialing function; a main storage apparatus 52 in which a CSV file 20 containing telephone directory date and abbreviated dialing data is stored; and an operation panel 53 for displaying an FAX number and a department code. The MFP1 comprises a reading apparatus 54 for scanning the surface of an original; an image processing unit 55 for converting the three-color image data received from the reading apparatus 54 to four printing colors; a printer unit 56 for forming an image on a paper and outputting the paper; and a paper feed unit 57 for feeding paper to the printer unit 56.

The printer unit 56 comprises image forming units 58, 59, 60, 61 for forming images of four colors and an exposure apparatus 62 based on laser light or LED (light emitting diode) light. The printer unit 56 comprises, along an intermediate transfer belt 63, the image forming units 58, 59, 60, 61. For example, the black image forming unit 61 comprises a photoconductive drum 64, a charger 65, a developing device 66 and a transfer device 67. The image forming units 58, 59, 60 are substantially identical to the image forming unit 61 in structure. Further, the MFP1 comprises: a plurality of pairs of rollers 68 for dragging paper from the paper feed unit 57; and a secondary transfer roller pair 69 for transferring four unfixed four-color toner images onto a paper. The MFP1 comprises: a fixing device 70 for fixing a toner image and a conveying path 71 located at a more downstream side than the fixing device 70 in paper conveying direction. The MFP1 may connect a binding unit 73 with a paper discharge opening 72. The MFP2 is substantially identical to the MFP1 in hardware structure.

Figure 2:
FIG. 2(a) is a diagram showing an example of the data form recorded in a file set in one's own apparatus, FIG. 2 (b) is a tabular drawing showing an example of the data form of another kind of apparatus.
Figure 2:

As shown in FIG. 1-FIG. 3, the function of the storage unit 10 of the MFP1 is achieved by the main storage apparatus 52, which is a hard disk drive (HDD) or a solid state drive (SDD). The storage unit 10 stores item data such as strings, numeric and symbols in a plurality of input fields in the CSV file 20 as registration data in advance. The CSV file 20 in the storage unit 10 inserts a separator (for example, a comma separator) between the plurality of item data and holds these item data in a row.

The external communication interface 11 is, for example, an LSI (large scale alignment) for transmitting data via an LAN interface. The external communication interface unit 11 receives the CSV file 21 of the MFP2 via the client PC3 . The CSV file 21 stores the item data separated by separation symbols The communication data reading unit 12 detects whether or not the file received is a CSV file. The communication data reading unit 12 acquires, if the file received is the CSV file 21 of another kind of apparatus, a plurality of records such as a telephone directory and a department code. The common data determination unit 13 determines whether or not the same record exists between a plurality of record of the CSV file 20 stored in the storage unit 10 and a plurality of record of the CSV file 21. In the example of FIG. 3, the common data determination unit 13 determinates whether or not to exist the common data between item names: 'abbreviated dialing, FAX number and department code' and item names: 'FAX number and department code', then the item name: 'FAX number' and 'department code' as the common data between the CSV 20 and the CSV 21.

The alignment processing unit 14 comprises: a common data copying unit 17 for copying the item data of the common item name of the CSV files 20 and 21; and a common data writing unit 18 for writing strings into a plurality of input fields corresponding to more than one copied item name. The alignment processing unit 14 (the common data copying unit 17 or the common data writing unit 18) ensures, through definition information, the absence of a necessary item name that should be imported and a plurality of input fields in the CSV file 21 and registers strings to each of the input fields. A necessary item refers to an item without which registration data cannot be set and which should be for example determined through an input through the operation panel in advance. The alignment processing unit 14 supplements item names if the item names defined to be in the data form used by one's own apparatus are insufficient so as to set, in the MFP1, necessary item data used by one's own apparatus.

The MFP1 having the structure above is installed in the business office again while the MFP2 is installed in the service already. The client PC3 is operated by the manager to display an access screen providing an access to the MFP1 and the MFP2. The client PC3 access the various files stored in the main storage apparatuses 52 of the MFP1 and the MFP2. The client PC3 sends a registration data file containing telephone directory data to the MFP2. Alternatively, the client PC3 accesses the registration data file of the main storage apparatus 52 directly from a PC screen and writes the registration data file of the main storage apparatus 52 into telephone directory data. By means of the client PC3, registration data such as a telephone directory is set in the MFP2.

Figure 4:
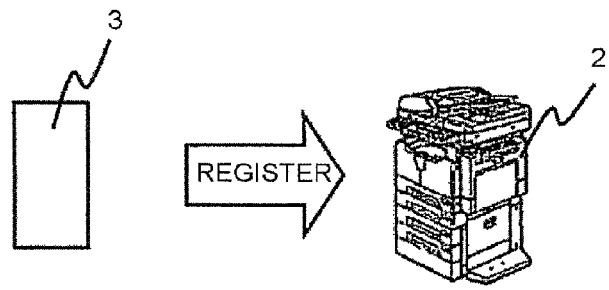
FIG. 4(a)-FIG. 4(c) are diagrams illustrating the import of a file to the information processing apparatus involved in embodiment 1.
Figure 4:
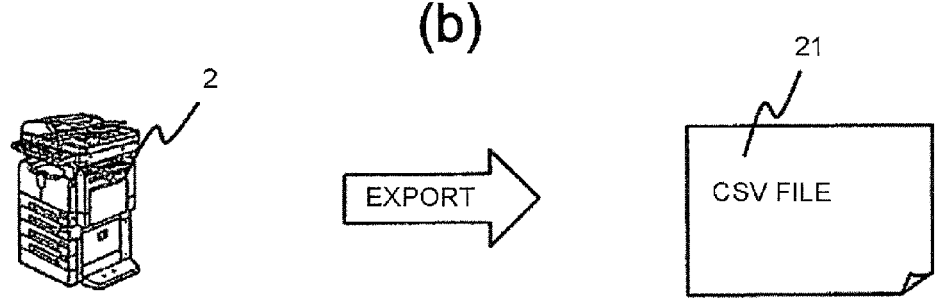
Figure 4:
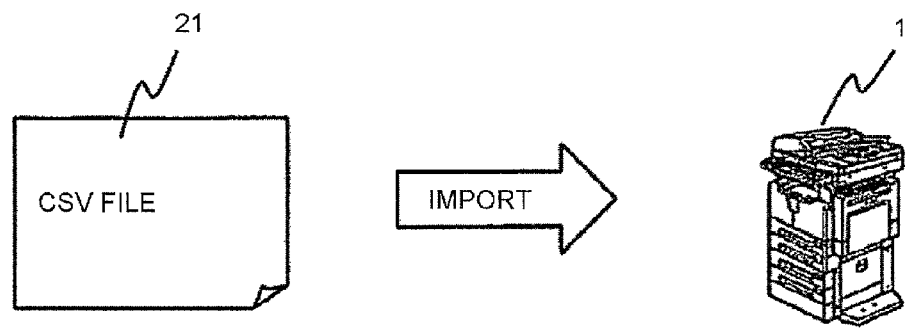

FIG. 4(*a*)-FIG. 4(*c*) are diagrams illustrating the import of a file to the image forming apparatus involved in embodiment 1. The reference symbol described above denotes the same member in FIG. 4(*a*)-FIG. 4(*c*). As shown in FIG. 4(*a*), the MFP2 is in a state in which a telephone directory and department codes are registered by the client PC3. As shown in FIG. 4(*b*), the MFP2 generates a CSV file 21 in a necessary data form with the registration data. The CSV file 21 is exported from the registration data. Then, the client PC3 accesses the MFP2 and acquires the CSV file 21. Next, as shown in FIG. 4(*c*), the client PC3 accesses the MFP1 and sends the CSV file 21 to the MFP1. The CSV file 21 is imported to the MFP1 from the MFP2.

Figure 5:
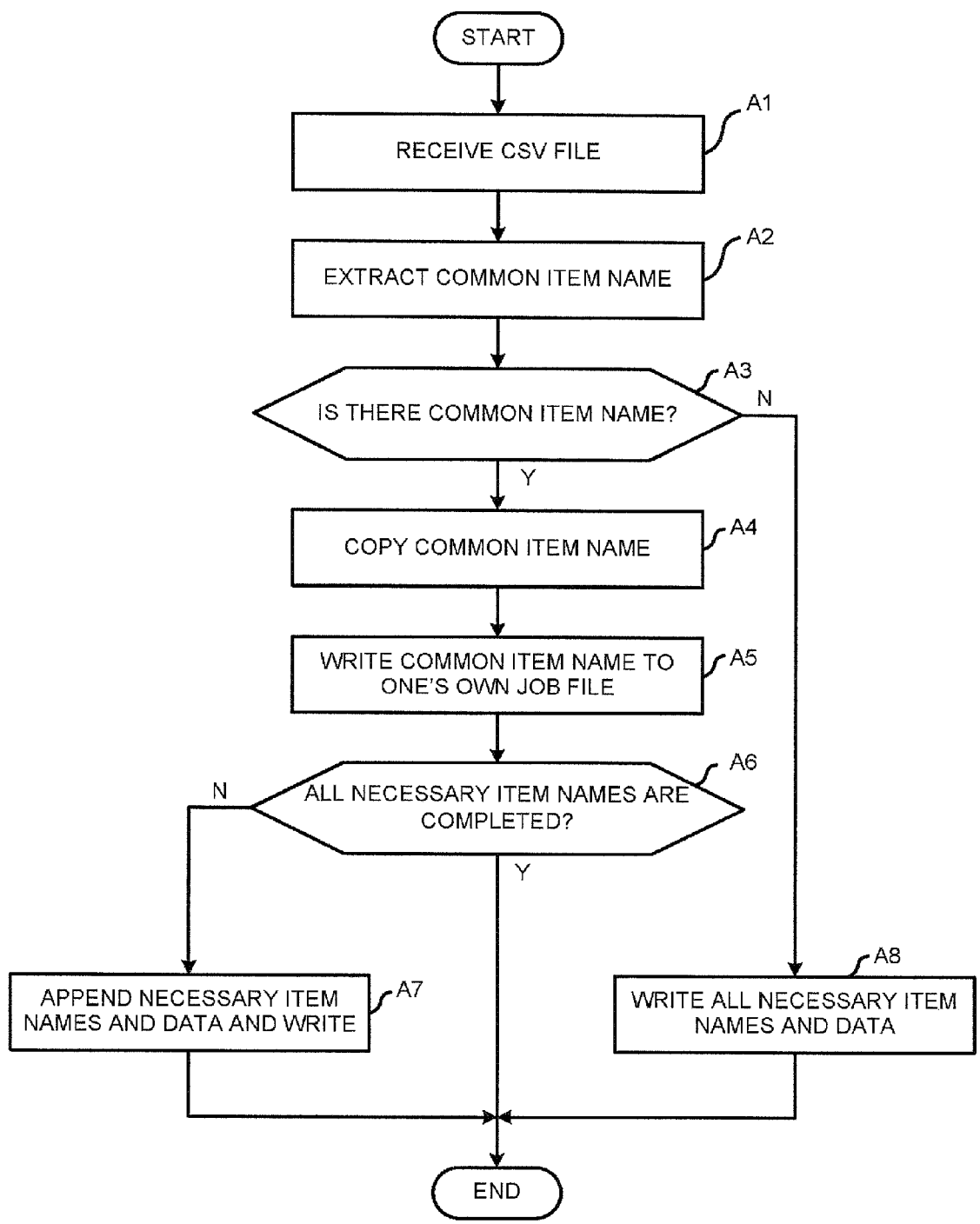
FIG. 5 is a flowchart illustrating the data transfer process of the information processing apparatus involved in embodiment 1.

FIG. 5 is a flowchart illustrating a data transfer processing carried out by the MFP1. In Act A1, the MFP1 receives the CSV file 21 by using the external communication interface unit 11. The MFP1 develops the CSV file 21 into an RAM (random access memory). In Act A2, the MFP1 extracts, by means of the index of item names, the common records of the CSV files 20 and 21 using the communication data reading unit 12. In Act A3, the MFP1 determines whether or not there is a common item name using the common data determination unit 13. In the example shown in FIG. 3, item names 'FAX number' and 'department code' are extracted as common item names. If the result of the determination of the common data determination unit 13 is Yes, the MFP1 copies the common item name data in Act A4 using the common data copying unit 17 through a route Y. In Act A5, the MFP1 writes the common item name data into the job file of the MFP1 in the RAM through the common data writing unit 18.

FIG. 6 (*a*) is a tabular drawing showing an example of definition information in the data form of one's own apparatus stored in the storage unit 10. The job file 22 is an empty format that only item name is given based on the definition information.

FIG. 6 (*b*) shows the content of the job file 22 after the MFP1 writes common item names 'FAX number', 'department code' and registration data corresponding to the common item names into the job file 22.

Next, in Act A6 shown in FIG. 5, the MFP1 determines, using the common data determination unit 13, whether or not necessary item names are all collected. The MFP1 may refer to the definition information in the storage unit 10 during the determination process. If the result of the determination of Act A6 is Yes, then the MFP1 ends the processing through the route Y. If the result of the determination of Act A6 is No, the MFP1 writes, in Act A7, for example, the item name 'abbreviated dialing' in a file of another kind of apparatus into the job file 22 as a necessary item name. In addition, the MFP 1 writes number data '01', '02', . . . , '20' into an input field corresponding to the item name 'abbreviated dialing' in the job file 22. Further, the MFP 1 writes for example, the item name 'one touch dial' (express it as "ONE-TOUCH" in Figures) in a file of one's own apparatus into the job file 22 as a necessary item name. In addition, the MFP 1 writes a data corresponding to the item name 'one touch dial' into the job file 22.

FIG. 6(*c*) is a tabular diagram showing the content of the job file 22 after the MFP1 writes item names 'abbreviated dialing', 'one touch dial' and corresponding data into the job file 22. The MFP1 covers/updates the CSV file 20 with the job file 22 of FIG. 6(*c*) as a new CSV file 20. Therefore, the CSV file 21 shown in FIG. 2(*b*) and the CSV file 20 shown in FIG. 6(*c*) are generated automatically. Additionally, if the result of the determination of Act A3 shown in FIG. 5 is No, the MFP1 writes, in Act A8, all the necessary item names and corresponding information using the common data writing unit 18 through a route N.

In conclusion, when data is imported to the MFP1, the MFP1 compares the data form of the MFP1 with the original data form of the MFP2. The MFP1 imports the data of the data forms which define the common member (an item name or an input field value) such as FAX number or telephone number. If the definition information does not meet between the data forms, the MFP1 blanks a column of the record that the definition information does not meet. If the item name falling an item name that should be input is not defined in the data form of the MFP1, MFP1 assigns the item name such as 'one-touch dial' to the column of the record and writes in the column of the record.

Data can be transferred between different kinds of apparatuses by using the MFP1. A necessary unregistered item that should be imported will be registered automatically. Thus, the data that must be input can be supplemented. An exchange function of transferring registration data of the MFP2 in which a telephone directory and department codes are registered to the MFP1 which is different in kind from the MFP2 is realized. For example, even if data items are inconsistent during a data transfer process, registration data can be registered automatically. The same telephone directories and the same department codes can be centrally set in different kinds of apparatuses. Thus, the manager and the service stuff are relieved from increased setting workload and achieve improved service efficiency.

(EMBODIMENT 2)

The information processing apparatus involved in embodiment 2 sets the information necessary for the execution of functions including color printing, monochrome printing, copy, scan and FAX by using a CSV file. The functional block diagram and the whole structure of the information processing apparatus involved in embodiment 2 are substantially identical to those of the MFP1 involved in embodiment 1.

FIG. 7 is a tabular drawing showing an example of the records in a CSV file set in an information processing apparatus involved in embodiment 2. As shown in FIG. 7(*a*), the alignment processing unit 15 may make destination information associate with item names and writes contact address information into an input field. Contact address, including the extension number of the business office, an email address and a telephone number for reporting a fault in the apparatus, are stored in the CSV file 23 stored in the storage unit 10 of the MFP1. As shown in FIG. 7(*b*), the alignment processing unit 15 may make a normal power consumption mode or a power-saving consumption mode associate with item names and writes printing condition information for printing in the normal power consumption mode or the power-saving consumption mode into the input field. The power-saving consumption mode is a mode in which power is less consumed that in the normal power consumption mode. As shown in FIG. 7(*c*), the alignment processing unit 15 may also make floor information such as the first floor or the second floor associate with item names and writes the information corresponding to color printing or monochrome printing into an input field. Conference documents can be colorfully printed and output in a reception room on the first floor. Further, as shown in FIG. 7(*d*), the alignment processing unit 15 may also make an area name such as a normal area or a prohibited area associate with item names and writes the number of the copies of each paper into an input field. Alternatively, the records shown in FIG. 7(*a*)-FIG. 7(*d*) may be gathered in one CSVBG file 23.

Figure 8:
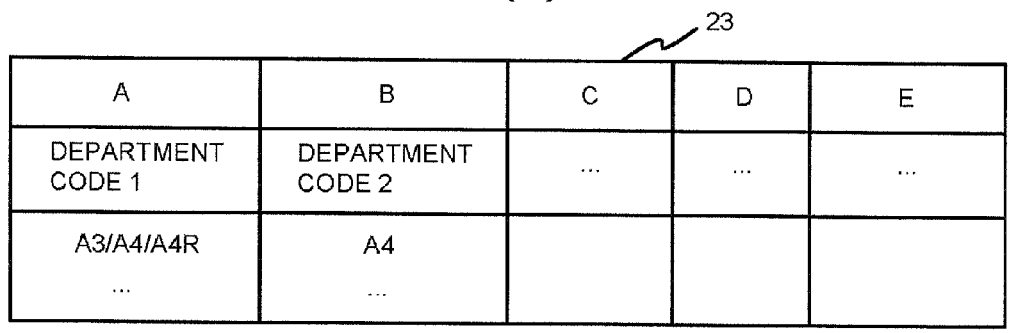
FIG. 8 is a tabular drawing showing still another example of the records in a file set in the information processin apparatus involved in embodiment 2.
Figure 8:
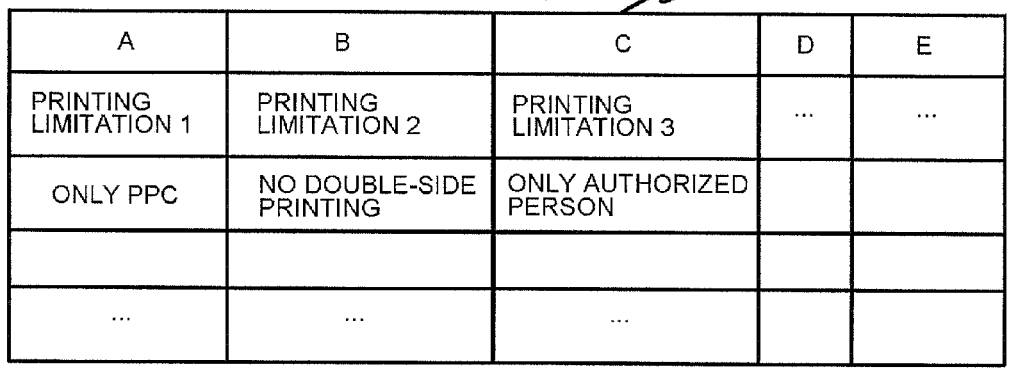

FIG. 8 is a tabular drawing showing another example of the records in the CSV file set in the information processing apparatus involved in embodiment 2. As shown in FIG. 8(a), the alignment processing unit 15 may also make a department code associate with an item name and writes paper size information (e.g. fixed type or size) into an input field. As shown in FIG. 8(b), the alignment processing unit 15 may also make a copy-prohibited content associate with an item name and writes limitation items into an input field.

For example, limitations such as 'only plain paper copier is available', 'whether to duplex print', 'printing function is available only authorized person' can be set by importing to the CSV file 23. Alternatively, the records shown in FIG. 8(a)-FIG. 8(d) may be gathered in one CSVBG file 23.

Thus, the contact address within a company may be centrally set. Limitations on power consumption, printing color, printing pages and the size and the number of exported papers may be set automatically by being input to a file distributed from the client PC3 according to the installation location and the utilization environment of the MP1.

Moreover, the MFP1 may set limitations on the binding and the punching of the binding unit 73 using the CSV file distributed. The MFP1 may also designate the upper limit of copies using the CSV file distributed. The MFP1 may also set, using the CSV file, item names with respect to the functions needed for the achievement of the actions of compound machines including the FAX apparatus 51, the reading apparatus 54, the image processing unit 55, the printing unit 56 and the paper feed unit 57. The alignment processing unit 15 correspondingly writes one or more of the setting information, the attributes and the parameters necessary for the execution of the functions into a plurality of input fields. In this way, desired management items can be set from the client PC3 even if different kinds of apparatuses are installed together.

In addition, a file in a CSV format is described in each embodiment above, however, a file in an XML format may be used by the information processing apparatus. In an XML file, each item name is recognized by using marks. The image forming apparatus distributes each mark to kinds of registration data in advance, for example, by writing text into an area located between marks '<' and '>', registration data substantially identical to the example in a CSV format can be set.

The data examples shown in FIG. 2(a), FIG. 2(b), FIG. 6, FIG. 7 and FIG. 8 are only illustrative and can be certainly changed in content. The external communication interface unit 11 maybe a communication interface different from the LAN interface, or the external communication interface unit 11 may be directly connected with the Internet.

In the embodiments above, the MFP1 is connected with the client PC by the LAN19; however, a data transfer operation may be carried out between the MFP1 and the client PC through a mobile storage device or through the operation of the manager. For example, the external communication interface unit 11 detects whether or not a USB (universal serial bus) memory and a memory card are inserted into the MFP1, reads the CSV file 21 into an RAM area, and then carries out a processing identical to that described in the example above. The advantages of the information processing apparatus involved in the embodiments above are not impaired in an embodiment to which only the variations above are applied.

While certain embodiments have been described, these embodiments have been presented by way of example only, and are not intended to limit the scope of the invention. Indeed, the novel embodiments of the embodiment may be embodied in a variety of other forms; furthermore, various omissions, substitutions and changes in the form of the embodiments of the embodiment may be made without departing from the spirit of the invention. The accompanying claims and their equivalents are intended to cover such forms and modifications as would fall within the scope and spirit of the invention.

What is claimed is:

1. An information processing apparatus capable of communicating with another information processing apparatus, comprising:
    a storage unit configured to store a first file including first records, each of the first records containing a first item name and a first input field, arrayed based on a first data form of the information processing apparatus and definition information defining the first data form;
    an operation panel configured to accept an inputting operation of storing the first file in the storage unit;
    a receiving unit configured to import a second file including second records from a client apparatus, each of the second records containing a second item name and a second input field, arrayed based on a second data form of the another information processing apparatus, the second file being exported from the another information processing apparatus to the client apparatus;
    a determination unit configured to determine whether or not there exists more than one common item name by comparison between the first records from the operation panel and the second records from the receiving unit; and
    an alignment processing unit configured to supplement a work file having the first data form by the definition information with any insufficient item name of the first item names according to a determination result by the determination unit, update the first file by the work file, the alignment processing unit aligning the first records and the second records.

2. The information processing apparatus according to claim 1, wherein
    the alignment processing unit copies and writes the common item name and second input field corresponding to more than one copied common item name to the storage unit according to an affirmative determination result by the determination unit.

3. The information processing apparatus according to claim 1, wherein
    the alignment processing unit transfers the second item names that should be input and the second input fields corresponding to the second item names to the storage unit according to a negative determination result by the determination unit.

4. The information processing apparatus according to claim 1, wherein
    the alignment processing unit associates multiple functions of a multi-function printer with the first item names and associates one or more of the setting information, the attributes and the parameters necessary for the execution of the functions with a plurality of first input fields.

5. The information processing apparatus according to claim 1, wherein
    the alignment processing unit associates destination information with the first item names and associates contact address information with the first input fields.

6. The information processing apparatus according to claim 1, wherein
    the alignment processing unit associates a normal power consumption mode or a power-saving consumption mode whose power consumption is less than that of the normal power consumption mode with first item names and associates printing condition information for printing in the normal power consumption mode or the power-saving consumption mode with the first input fields.

7. The information processing apparatus according to claim 1, wherein
the alignment processing unit associates floor information with the first item names and associates a color printing or a monochrome printing with the first input fields.

8. The information processing apparatus according to claim 1, wherein
the alignment processing unit associates area information with the first item names and associates multiple pages per sheet with the first input fields.

9. The information processing apparatus according to claim 1, wherein
the alignment processing unit associates department code with the first item names and associates paper size information with the first input fields.

10. The information processing apparatus according to claim 1, wherein
the alignment processing unit associates copy-prohibited content with the first item names and associates prohibited item with the first input fields.

* * * * *